No. 745,878. PATENTED DEC. 1, 1903.
G. E. & S. N. MENTEL.
PNEUMATIC TIRE PROTECTOR.
APPLICATION FILED OCT. 1, 1903.
NO MODEL.
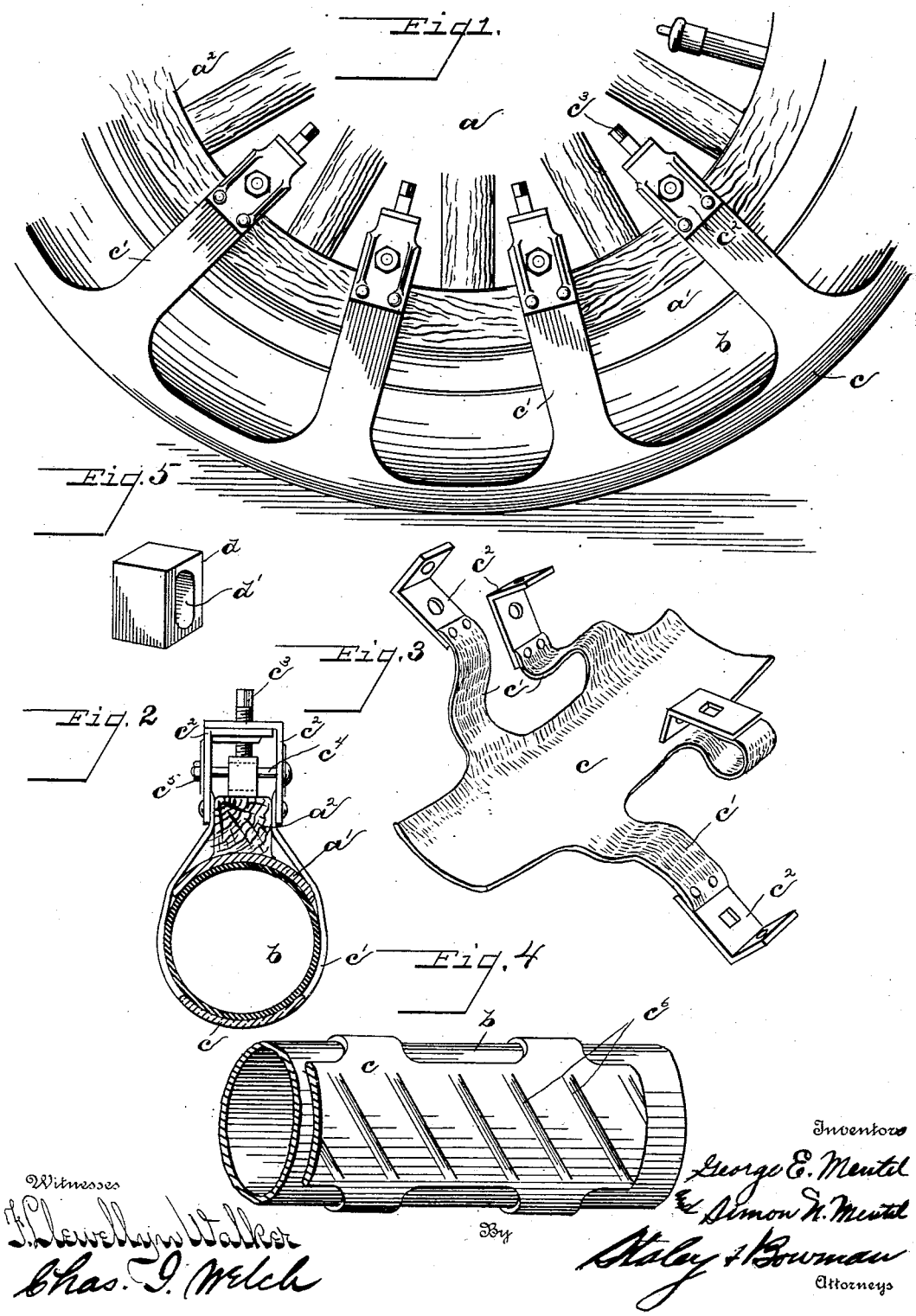

No. 745,878. Patented December 1, 1903.

UNITED STATES PATENT OFFICE.

GEORGE E. MENTEL AND SIMON N. MENTEL, OF SPRINGFIELD, OHIO.

PNEUMATIC-TIRE PROTECTOR.

SPECIFICATION forming part of Letters Patent No. 745,878, dated December 1, 1903.

Application filed October 1, 1903. Serial No. 175,281. (No model.)

*To all whom it may concern:*

Be it known that we, GEORGE E. MENTEL and SIMON N. MENTEL, citizens of the United States, residing at Springfield, in the county of Clark and State of Ohio, have invented certain new and useful Improvements in Pneumatic-Tire Protectors, of which the following is a specification.

Our invention relates to improvements in devices for protecting pneumatic tires for vehicles, to guard the same against punctures and destruction by the cutting action of glass and other substances which may be encountered in the use of pneumatic tires, especially on automobiles and similar vehicles.

Our invention consists of the constructions and combinations hereinafter described, and set forth in the claims.

In the accompanying drawings, Figure 1 represents a partial side elevation view of a vehicle-wheel provided with a pneumatic tire and our improved tire-protector. Fig. 2 is a transverse sectional view of the same. Fig. 3 is a detail view in perspective of a portion of the protector as it appears removed from the wheel. Fig. 4 is a detail view showing a portion of the device and the tread of the same provided with antislipping devices. Fig. 5 is a detail view of a portion of the clamps to secure the protector in place.

Like parts are represented by similar characters of reference in the several views.

In the drawings, $a$ represents an ordinary vehicle-wheel having a metallic felly $a'$, with an inner rim $a^2$ of wood. $b$ is a pneumatic tire applied thereto in any usual way. $c$ represents our improved protecting device. It consists, preferably, of an endless band of rubber-covered fabric, leather, or other similar non-elastic flexible substance which is adapted to resist the cutting effect of foreign substances and to prevent the puncture of the rubber of the pneumatic tire. This protector is formed throughout its length with a series of straps $c'$ at each side, the straps being arranged opposite to each other and each provided with an L-shaped metal piece $c^2$, riveted or otherwise secured to the end thereof to form a clamp, as hereinafter described. These clamping-pieces $c^2$ are each provided with openings in the respective flanges thereof, the openings being so arranged that when the straps are brought together the outer flanges will stand parallel to each other and overlap, with the openings through the respective flanges coincident with each other and adapted to receive set-screws $c^3$, as shown in Fig. 2. The openings in the sides of the flanges are also so arranged that when the parts are in the position indicated these openings will also stand coincident and are adapted to receive clamping-bolts $c^4$. One of the openings in the outer flange is screw-threaded and adapted to be engaged by the set-screw $c^3$. The other opening is of sufficient size to permit the set-screw to pass loosely through the same. One of the openings in said flanges is preferably square, as shown in Fig. 3, to receive the square part of the bolt $c^4$ to prevent the same from turning, the opening in the other flange being of sufficient size to permit the bolt to pass through the same and be engaged on the outside by a nut $c^5$. The outer flanges of the clamping-plates are preferably made of a size so that when the set-screw is in place the side flanges or vertical flanges will stand on opposite sides of the inner rim $a^2$ of the vehicle-wheel. Between the flanges and resting on the inner periphery of the inner rim of the vehicle-wheel is a block $d$, provided with a slotted opening $d'$, which is adapted to surround the bolt $c^4$, which passes through said block. This block is also adapted to receive the end of the set-screw $c^3$ when the same is tightened in place and to form an abutment therefor.

In applying our improved protector the set-screws and bolts are removed, the straps are extended, the tire is deflated, and the protector is slipped into place on the outer periphery of the tire. The straps are brought together, with the respective clamps placed between the spokes of the wheel. The blocks $d$ are placed on the rim and the set-screws passed through the horizontal flanges of the clamping-plates and screwed up against said block. The clamping-bolts are then slipped into position and tightened sufficiently to bring the inner sides of the straps where they are attached to the lower edges of the clamping-plates slightly against the wheel-rim. The set-screws are now gradually tightened until the device is pulled firmly against the outer periphery of the tire, after which the clamping-bolts are drawn tight, so as to clamp the edges of the strap firmly against the inner rim of the wheel-felly.

By the constructions above described we are enabled to fully protect the pneumatic tire of a vehicle-wheel adapted for any size or weight of vehicle. By means of the set-screws we are enabled to draw the protector tightly against the tire, so as to resist all the pressures that shall come thereon either from within or without, after which it may be clamped firmly in place by the clamping-bolts, as described.

In Fig. 4 we have shown the protector provided with ribs $c^6$, which may be used or not, as described, but which for some work may be found desirable to prevent slipping.

It is obvious that the device is adapted to any of the various forms of wheel-rims, either wooden or metal.

Having thus described our invention, we claim—

1. The combination with a wheel-rim and a pneumatic tire thereon, of a protecting-tread of rubber-covered fabric, leather or similar substance having the side straps with angular-shaped clamping-plates as described, said plates being adapted to overlap and being provided with set-screws and clamping-bolts, substantially as and for the purpose specified.

2. The combination with the wheel-rim and a tire thereon, of an outer tread of non-elastic material having the oppositely-arranged straps and the overlapping clamping-plates as described, and means for drawing said straps inwardly toward the center of the wheel and clamping the same against the wheel-rim, substantially as specified.

3. The combination with the endless strip of rubber-covered fabric, leather or other protecting material having the oppositely-arranged side straps with clamping-plates having overlapping portions or flanges, said flanges being perforated to receive set-screws which screw into one of said plates, an interposed block against which said set-screws are adapted to bear, clamping-bolts extending laterally through the outer flanges of said plates, said blocks being perforated with slotted openings through which said clamping-bolts pass, substantially as specified.

4. The combination with the wheel-rim of the band of rubber-covered fabric, leather or similar material having the oppositely-extending straps to which are riveted or otherwise secured clamping-plates, the said bands extending on the inside of said plates and adapted to rest between said plates and the wheel-rim, clamping-bolts for clamping said plates against said bands and against the wheel-rim, and tension-bolts or set-screws for drawing said plates inwardly to tighten the straps on said band, substantially as specified.

In testimony whereof we have hereunto set our hands this 29th day of September, A. D. 1903.

GEORGE E. MENTEL.
SIMON N. MENTEL.

Witnesses:
CHAS. I. WELCH,
F. LLEWELLYN WALKER.